United States Patent
Conradi

(10) Patent No.: US 11,846,378 B2
(45) Date of Patent: Dec. 19, 2023

(54) HEATED PIPELINE WITH HIGH HEATING EFFICIENCY

(71) Applicant: TotalEnergies SE, Courbevoie (FR)

(72) Inventor: Ivo Conradi, Pau (FR)

(73) Assignee: TotalEnergies SE, Courbevoie (FR)

( * ) Notice: Subject to any disclaimer, the term of this patent is extended or adjusted under 35 U.S.C. 154(b) by 23 days.

(21) Appl. No.: 17/619,061

(22) PCT Filed: Jun. 20, 2019

(86) PCT No.: PCT/IB2019/000827
§ 371 (c)(1),
(2) Date: Dec. 14, 2021

(87) PCT Pub. No.: WO2020/260920
PCT Pub. Date: Dec. 30, 2020

(65) Prior Publication Data
US 2022/0299148 A1    Sep. 22, 2022

(51) Int. Cl.
*F16L 53/38* (2018.01)
*F16L 59/14* (2006.01)

(52) U.S. Cl.
CPC .............. *F16L 53/38* (2018.01); *F16L 59/143* (2013.01)

(58) Field of Classification Search
CPC ................................ F16L 53/38; F16L 59/143
See application file for complete search history.

(56) References Cited

U.S. PATENT DOCUMENTS

| | | | | |
|---|---|---|---|---|
| 4,038,519 A * | 7/1977 | Foucras | .................... | H05B 3/58 219/505 |
| 4,798,230 A * | 1/1989 | Hopperdietzel | ........ | F16L 53/38 392/480 |
| 5,381,511 A * | 1/1995 | Bahar | ..................... | F16L 53/38 138/104 |
| 6,940,054 B1 * | 9/2005 | Heggdal | ................. | F16L 53/32 392/314 |
| 8,678,042 B2 * | 3/2014 | Quigley | ............... | F16L 11/085 138/123 |
| 8,921,692 B2 * | 12/2014 | Nelson | ..................... | H01B 7/14 174/128.1 |
| 2001/0050110 A1 * | 12/2001 | Born | ....................... | F16L 53/38 264/46.5 |

(Continued)

FOREIGN PATENT DOCUMENTS

| | | |
|---|---|---|
| FR | 2 991 024 A1 | 11/2013 |
| GB | 2559489 A | 8/2018 |
| WO | 2016/085480 A1 | 6/2016 |

OTHER PUBLICATIONS

International Search Report issued in PCT/IB2019/000827 dated Jan. 30, 2020.

*Primary Examiner* — Craig M Schneider
*Assistant Examiner* — David R Deal
(74) *Attorney, Agent, or Firm* — TROUTMAN PEPPER HAMILTON SANDERS LLP

(57) ABSTRACT

The heated pipeline comprises an inner pipe intended to convey a fluid, and an outer coating made of a thermal insulating material and covering the inner pipe. The outer coating comprises at least one duct delimited, in a transverse plane, by a closed outline entirely defined in the thermal insulating material, each duct housing a respective heating element.

10 Claims, 3 Drawing Sheets

(56) References Cited

U.S. PATENT DOCUMENTS

| | | | | |
|---|---|---|---|---|
| 2003/0079787 A1* | 5/2003 | Heise | ............... | F16L 53/38 |
| | | | | 219/535 |
| 2009/0107558 A1* | 4/2009 | Quigley | ............ | F16L 11/12 |
| | | | | 137/15.01 |
| 2013/0213487 A1* | 8/2013 | Qu | ............ | F16L 53/38 |
| | | | | 137/13 |
| 2014/0110004 A1* | 4/2014 | Westmeier | ........ | B32B 27/34 |
| | | | | 118/500 |
| 2016/0161042 A1* | 6/2016 | Green | ............ | E21B 17/1035 |
| | | | | 138/140 |
| 2016/0348808 A1* | 12/2016 | Green | ............... | F16L 1/15 |

\* cited by examiner

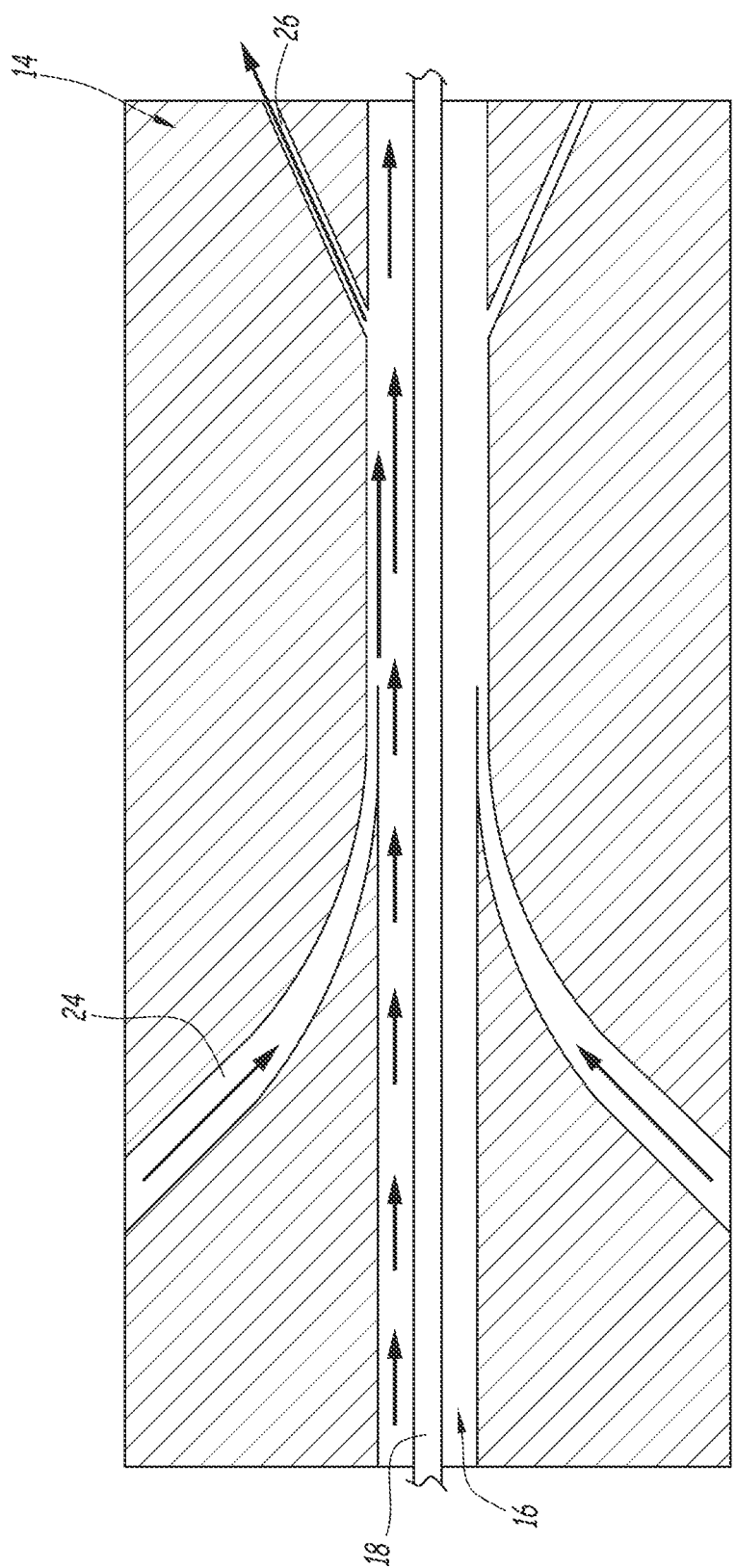

HEATED PIPELINE WITH HIGH HEATING EFFICIENCY

CROSS REFERENCE TO RELATED APPLICATIONS

The present application is a U.S. National Phase Application under 35 U.S.C. § 371 of International Patent Application No. PCT/IB2019/000827 filed Jun. 26, 2019. The entire contents of which are hereby incorporated by reference.

FIELD OF INVENTION

The present invention relates to a heated pipeline for conveying fluids, for instance multiphase oil, gas and water production.

BACKGROUND

Such a heated pipeline is for example used for conveying fluids in an undersea environment. However, the invention can be implemented for any type of heated pipeline.

Heating the pipeline has several benefits, such as preventing plugging in the pipeline because of formation of hydrates and/or waxes.

Some heated pipelines are already known from prior art. For example, known heated pipelines are heated by direct electrical heating or by heat traced pipe-in-pipe. However, it should be noticed that direct electrical heating suffers from a low electrical efficiency (because of a part of the electrical power that is lost in the water), and that heat traced pipe-in-pipe is very expensive due to its architecture. Heat traced pipe-in-pipe is also very heavy, making it difficult to install at larger water depths or in larger diameters.

SUMMARY

The invention particularly aims to solve these problems by offering a heated pipeline with high heating efficiency at a low cost.

To this end, the invention relates to a heated pipeline for conveying fluid, comprising an inner pipe intended to convey the fluid, and an outer coating made of a thermal insulating material and covering the inner pipe, characterized in that the outer coating comprises at least one duct delimited, in a transverse plane, by a closed outline entirely defined in the thermal insulating material, each duct housing a respective heating element.

The inner pipe is heated by the at least one heating element arranged in the at least one duct. The heating efficiency is high by arranging the duct sufficiently close to the inner duct.

It should be noticed that making ducts in the outer coating is easy to perform and implies a low cost.

The heated pipeline according to the invention can have any of the following features, taken alone or in any possible combination of features.

The heated pipeline extends from a first end to a second end, wherein each duct is continuous between the first and second ends, each duct being able to hold a pressure higher than 3 bar.

The heated pipeline extends from a first end to a second end, wherein the inner pipe is made of a plurality of aligned assembled pipe sections, the outer coating is made of a plurality of aligned assembled coating sections, and each heating element is made of at least one respective continuous part longer than each pipe section, preferably made of only one respective continuous part extending from the first end to the second end.

Each duct is straight or helical.

Each duct being delimited by a wall, at least one of the heating element and the wall is coated with la low friction layer.

The outer coating comprises at least two ducts, and the heating elements comprise cables chosen between: at least two single phase AC cables, each heating element being one of these single phase AC cables and being arranged in one respective of the ducts, at least two single phase DC cables, each heating element being one of these single phase DC cables and being arranged in one respective of the ducts, or at least one three-phase cable, arranged as three mono-phase cables, each mono-phase cable forming one of the heating elements and being arranged in one respective of the three ducts.

The heated pipeline comprises at least one injection path communicating with the at least one duct, for injecting high pressurized water in this at least one duct.

The invention also relates to a method of manufacturing a heated pipeline as specified above, characterized in that it comprises the following steps:
  assembling pipeline segments, each having a respective pipe section and a respective coating section, to make the inner pipe with the outer coating, the outer coating having at least one duct arranged in the insulating material,
  inserting a respective heating element in each duct by applying a pressure differential over the length of the duct potentially aided by a push force on the heating element.

Preferentially, each heating element is inserted in the respective duct by pulling it along by pressurized fluid injected in the duct.

BRIEF DESCRIPTION OF DRAWINGS

Other aspects and advantages of the invention will be shown in the specification hereafter, only given as a non-limitative example, and made in view of the annexed figures in which:

FIG. 3 is a cross-sectional view of the heated pipeline of FIG. 1, in a longitudinal plane, at an injection point for injecting water in at least one duct of the heated pipeline.

DETAILED DESCRIPTION

Figure 1:
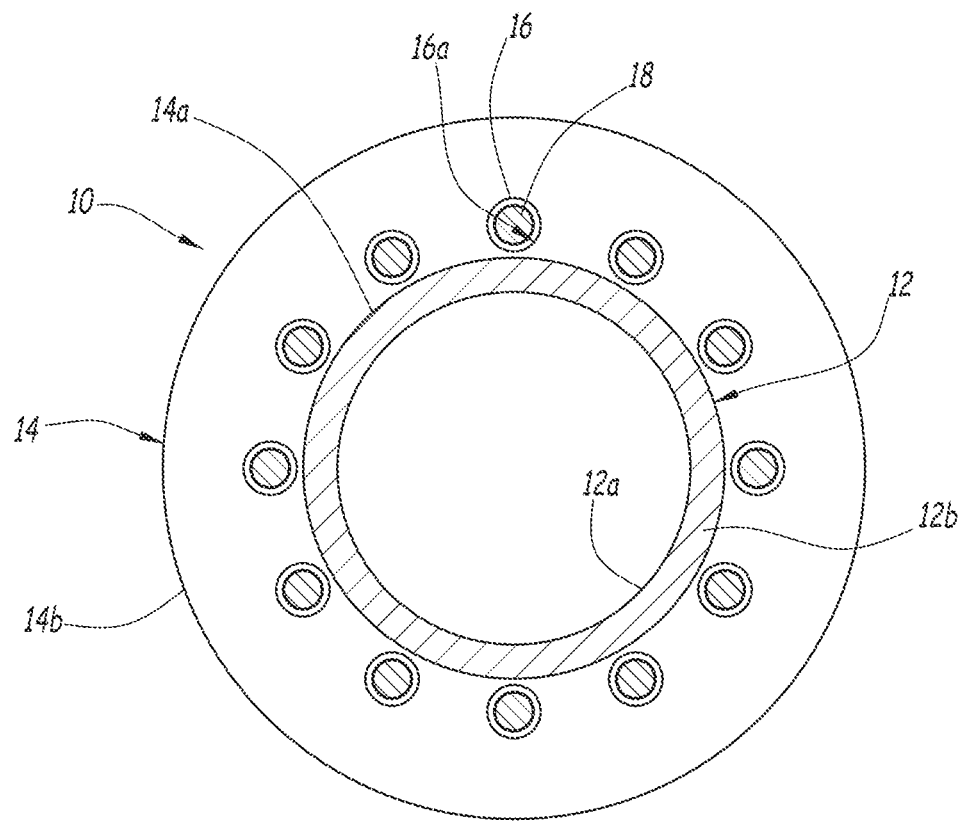
FIG. 1 is a cross-sectional view of a heated pipeline according to an example embodiment, in a transversal plane.

A heated pipeline 10 is shown on FIG. 1. Such a heated pipeline 10 is intended to convey a fluid, for instance hydrocarbons, for example in an undersea environment or in a variant in any other environment. The heated pipeline 10 extends from a first end to a second end, to convey the fluid from the first end to the second end.

For example, the first end is connected to a Floating Production Storage and Offloading (FPSO), or to a shallow water platform, or to any conceivable marine vessel.

The heated pipeline 10 is preferentially made of a plurality of aligned assembled segments 11. Two adjacent segments are shown on FIG. 2, and will be described later.

For instance, each segment 11 has a length comprised between 2 meters and 30 meters, typically of about 12 meters.

The heated pipeline 10 comprises an inner pipe 12. The inner pipe 12 has an internal face 12*a* and an external face 12*b*. The internal face 12*a* delimits an interior in which the fluid is intended to flow.

The inner pipe 12 is made of a plurality of aligned assembled pipe sections 13. More particularly, each segment 11 comprises a respective pipe section 13.

The inner pipe 12 is usually made of metal, for instance steel, carbon steel, etc. The inner pipe 12 could in a variant consist of any other suitable material, such as composite material.

In the shown embodiment, the inner pipe 12 has a circular cross section in a transversal plane, as shown on FIG. 1. For instance, the diameter of the interior of the inner pipe is of about 4 inch to 60 inch. It should be noticed that the inner pipe 12 could have any other appropriate shape in other embodiments.

The heated pipeline 10 also comprises an outer coating 14 made of a thermal insulating material and covering the inner pipe 12. For example, the thermal insulating material is a polymeric material, or any other suitable material.

Preferentially, the heated pipeline 10 comprises an anti-corrosion layer radially arranged between the inner pipe 12 and the outer coating 14.

The outer coating 14 is made of a plurality of aligned assembled coating sections 15. More particularly, each segment 11 comprises a respective coating section 15.

The outer coating 14 has an internal surface 14*a* and an exterior surface 14*b*.

The internal surface 14*a* of the outer coating 14 is continuously adjacent to or bonded to the exterior face 12*b* of the inner pipe 12. In a variant, one or multiple anti-corrosion layers could be arranged between the internal surface 14*a* of the outer coating 14 and the exterior face 12*b* of the inner pipe 12.

The external surface 14*b* of the coating 14 is in contact with seawater when the pipeline 10 is arranged undersea. In a preferred variant, the external surface 14*b* of the coating 14 has an external protection layer, and this protection layer is in contact with seawater when the pipeline 10 is arranged undersea.

Thus, in the example shown, the internal surface 14*a* of the outer coating 14 has a circular cross section in the transverse plane. The external surface 14*b* of the outer coating 14 preferentially also has a circular cross section in the transverse plane. For instance, the radial distance between the internal surface 14*a* and the external surface 14*b* is between 30 and 500 mm, preferably between 100 and 150 mm, for example about 120 mm. It should be noticed that the outer coating 14 could have any other appropriate shape in other embodiments. The outer coating 14*b*, or its external protection layer, is in direct contact with environment, for example water when the pipeline is subsea, in this case the insulation is called wet insulated.

The outer coating 14 comprises at least one duct 16, intended to receive a respective heating element 18.

Each duct 16 is delimited by a wall 16*a* formed, in the transverse plane, by a closed outline entirely defined in the thermal insulating material. In one embodiment, a part of the thermal insulating material extends between each duct 16 and the inner pipe 12, so that the heating element 18 cannot comes in contact with the inner pipe 12 and such that the duct consists of a confined space that allows holding pressure. In another embodiment, the duct 16 is separated from the outer coating 14 by means of another layer of material to that separates the fluid in the duct from the outer coating 14. Preferentially, each duct 16 is closer of the internal surface 14*a* than the external surface 14*b* of the outer coating 14.

In the example shown, the closed outline of each duct 16 is circular in the transverse plane. For instance, the duct 16 has a duct diameter between 15 and 100 mm, for instance of about 40 mm.

Each duct 16 extends from the first end to the second end, following a straight shape parallel to the inner pipe 12.

In a variant, each duct 16 extends from the first end to the second end, following a helical shape around the inner pipe 12.

It should be noticed that, preferentially, each heating element 18 is made of only one part extending from the first end to the second end of the heated pipeline 10, on contrary to the inner pipe 12 that is made of the plurality of aligned assembled pipe sections 13, and on contrary to the outer coating 14 that is made of the plurality of aligned assembled coating sections 14. Thus, there is no need to manage interfaces between several parts of a heating element. As a result, the manufacturing of the heated pipeline 10 is facilitated.

To this end, each heating element 18 is inserted in the corresponding duct 16 after the pipe sections 13 being assembled, either into their final length at their final location or in intermediate assemblies.

In order to facilitate the insertion of the heating element 18 in the corresponding duct 16, at least one of the heating element 18 and the wall 16*a* of the duct 16 is preferentially coated with a low friction layer. Thus, the friction between the heating element 18 and the wall 16*a* is limited during the insertion. Another solution could be to fill the duct 16 with oil prior to the heating element insertion, or to add lubricants to a fluid used to install the heating element 18 as described later.

Preferentially, the heating element 18 is made of a light construction, for example by using aluminum or lightweight coating, such that the density of the heating element is close to the density of the fluid inside the duct 16 during the installation, which reduces the friction during the installation.

Besides, preferentially each heating element 18 is an electric cable having a cable diameter, such that the duct diameter of the corresponding duct 16 is larger (for example at least twice larger) than the cable diameter of the heating element 18. Thus, the insertion is also facilitated.

In conformity with the disclosed embodiment, the at least one heating element 18 comprise at least one cable. Heating element 18 could be powered by any electrical solution, DC current, AC monophasic, or AC three phases.

DC current has the best efficiency, as it does not suffer from capacitive current. It also permits to reduce cable diameter due to the lower ohmic losses. To obtain the same heating effect by joule effect losses we have to reduce the diameter of the cable, the cable is then lighter and allow a better insertion in the duct, the buoyancy of the heating cable could be easier to achieve.

In case a three phases system is used, each three-phase system is arranged as three mono-phase cables, each mono-phase cable passing through a respective duct 16. Thus, each heating element 18 is one of these mono-phase cables. In this case, the outer coating 14 has at least three ducts 16, each duct receiving one of the three mono-phase cables 18.

The three mono-phase cables are connected at least at the first and/or the second end of the pipeline 10. For example, the three phases are connected subsea to each other, preferentially using slim connector that allows passing through the duct 16, and they are potentially also earthed to the sea.

In a variant, each heating element 18 can be formed by a three-phase cable, with the three phases inserted in a same duct 16.

It should be noticed that, if necessary, the distant end of each heating element 18 could be suitable to be connected to the distant end of at least one other heating element 18, in case several heating elements 18 have to be connected at the second end of the pipeline 10 (e.g. neutral point connected to the sea).

In a variant, the outer coating 14 has at least six ducts 16, wherein three ducts 16 receive the three mono-phase cables in which an electric current circulates in a first direction, and three other ducts 16 receive the three mono-phase cables in which the electric current circulates in a second direction opposite to the first direction. In other words, the cables are looped back from a duct 16 to another duct 16, at the second end.

In a variant, the outer coating 14 has twelve ducts 16, more particularly two groups of six ducts 16, each group receiving a respective three-phase cable. In this case, three ducts 16 are angularly inserted between the mono-phase cables 14 of each pair of two mono-phase cable 18 of a same three-phase cable.

In a variant, at least one of the duct 16 houses a monitoring optic fiber for temperature sensing. This optic fiber may be inserted in the corresponding duct 16 in the same manner as the heating elements 18 are inserted in their corresponding ducts 16.

In a variant, if DC or mono phase current is used, the heated pipeline 10 comprises an end segment that is different from the other segments 11, in that the ducts 16 in this end segment have a U-shape to form a return. In this case, this return allows a return of the heating element 18 arranged in this duct 16.

Figure 2:
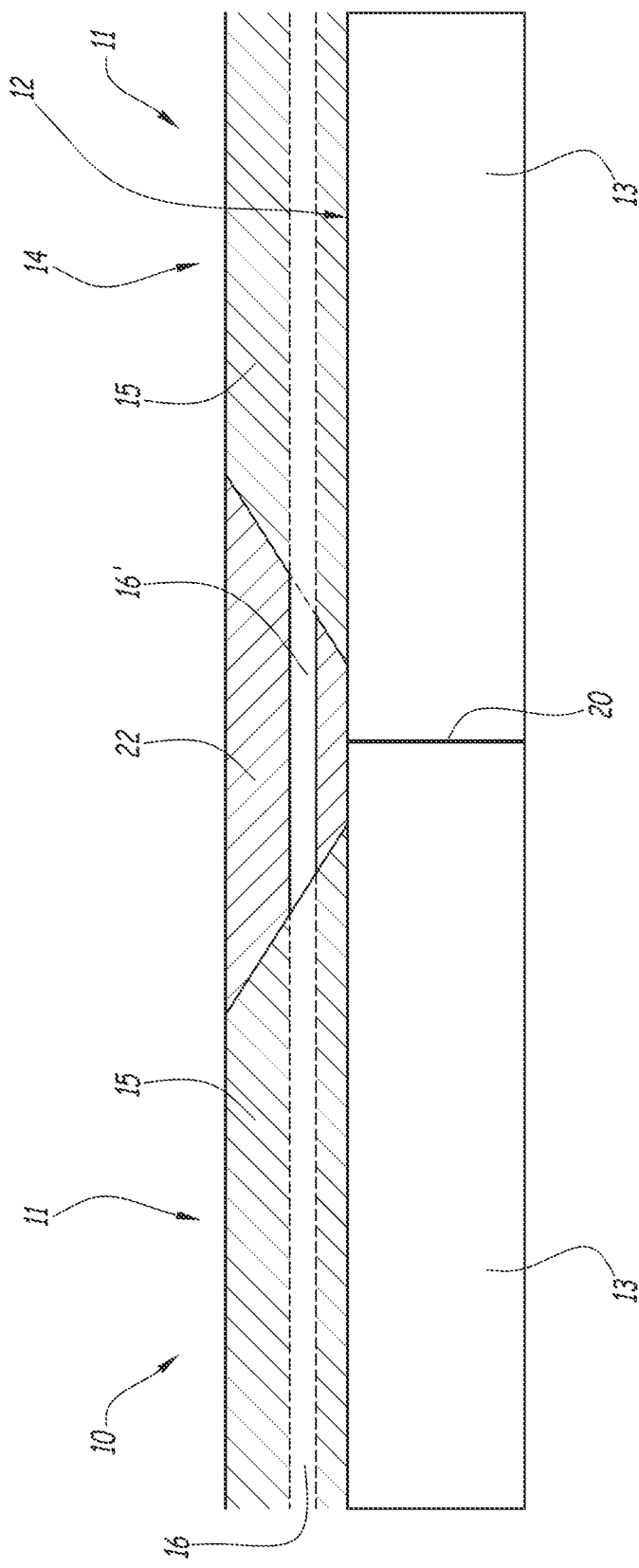
FIG. 2 is a cross-sectional view of the heated pipeline of FIG. 1, in a longitudinal plane, at an interface between two segments of the pipeline.

The interface between two successive segments 11 of the heated pipeline 10 is shown on FIG. 2.

As disclosed before, each segment 11 comprises a pipe section 13 of the inner pipe 12, surrounded by a respective coating section 15 of the outer coating 14.

The ends of each pipe sections 13 are perpendicular to a longitudinal axis of the inner pipe 12, so they are parallel with each other, and they meet at a junction line 20. In the case of steel pipes this is usually a weld.

The ends of the coating sections 15 are for example tapered, preferentially with a same angle. The ends of the coating sections 15 could have in variant any other suitable shape or configuration. In order to ensure a good insulation at the interface, the interface comprises a junction member 22 arranged between the ends of the two adjacent coating sections 15. The junction member 22 has a shape that is complementary to the shapes of the ends of the coating sections 15.

It should be noticed that the junction member 22 has, for each duct 16, a junction duct 16', which is aligned with the corresponding duct 16 of the coating sections 15. For example, the junction duct 16' is made of a tube embedded in the junction member 22. Preferentially, this tube extends from each end of the junction member 22, so as to be able to be partially inserted in the duct 16 on both sides.

The junction member 22 is for example made of polyurethane.

In the embodiment of FIG. 3, the outer coating 14, or in a variant the junction member 22, comprises at least one injection path 24 communicating with the at least one duct 16. This injection path 24 is used for injecting pressurized water in the duct 16, in order to pull the heating element 18 in this duct 16, as it will be described later.

Preferentially, the outer coating 14, or in a variant the junction member 22, also comprises at least one exit path 26.

A method for manufacturing the heated pipeline 10 will now be disclosed.

In a first step, the segments 11 of the heated pipeline 10 are assembled together, so that the heated pipeline 10 extends from the first end to the second end. This first step could be made partially, so that the heated pipeline 10 has not its final length towards its final location, but it has an intermediate length.

During this first step, the pipe sections 13 are assembled together at the junction lines 20, for instance by welding. The coating sections 15 are also assembled together, using the junction member 22 as specified above.

It should be noticed that the coating sections 15 comprise the ducts 16 before being assembled together. For instance, the ducts 16 are bored in the coating sections 15, before the assembly.

The method then comprises a step of inserting a respective heating element 18 in each duct 16 by a pressure differential over the length of the duct 16, which transmits a distributed pull force along the heating element 18 by way of fluid friction. Additional insertion force can be generated by pushing the heating element at the insertion point.

This step is performed after all the segments 11 are assembled together. In other words, the heating element 18 is not put in place at the same time as the inner pipe 12, but after. As a result, the heating element 18 is not made of a plurality of segments, but the heating element 18 is continuous, made of only one part extending from the first end to the second end. In a variant, the heating element 18 is made of a plurality of segments, but each segment is significantly longer than each pipe section 13.

Preferentially, each heating element 18 is inserted in the respective duct 16 by being pulled along by pressurized fluid injected in the duct 16. To this end, each duct is preferentially able to hold a pressure higher than 3 bar.

The fluid is for example injected at the first end, at the same place as the heating element 18 is inserted. The pressurized fluid could be pressurized water, air, oil, or any other suitable pressurized fluid. In a subsea environment the pressure, where hydrostatic pressures are significantly higher than in air, a pressure differential can be created by pumping fluid from the distant side of the duct 16, either to enhance the pressure differential or to avoid interaction between heating element insertion and pumping.

Preferentially, to favor the driving of the heating element 18, the heating element 18 has its buoyancy improved, by connecting buoyancy balls to the heating element or by having an insulation sheath having a neutral buoyancy.

In case the first end of the pipeline 10 is not readily accessible (for example undersea), the pipeline 10 comprises at its first end, at the end of each duct 16, a latching mechanism intended to receive an electrical connector. The electrical connector, connected at one end of the heating element 18, is put into place in the same manner as the heating element 18, being pushed by water pressure in an installation tube towards the duct 16. The installation tube runs between an installation vessel or location and the duct 16.

In a variant of this case, the insertion of the heating element 18 could be applied using a subsea apparatus for cable injection into the pipeline ducts 16. This is useful when the pipeline is not readily accessible. In this case the storage of the heating element 18 to be installed can be either on the installation vessel/location or on a (subsea) reel/drum/basket.

In order to overcome pressure drop along the duct 16, additional pressurized fluid can be injected at intermediate injection points between the first and the second ends. The injection points comprise said injection paths 24, there pressurized fluid is accelerated in a nozzle and adds energy to the flow by way of turbulent mixing.

It should be noticed that the exit paths 26 allow evacuating water from the duct 16 since additional water is injected via the injection paths 24. In addition or in a variant, a pump could be used to reduce the pressure of the water column inside the duct 16. This pump could be removed once the heating element 18 inserted.

In a variant, the heating element 18 can be pulled through the duct 16 by any other suitable means.

In a first variant the cable is inserted following the water (or oil flow) in the duct 16, no watertight means exists between the heating cable and the duct. The cable may be equipped of means to react to the flow in order to have a better flow through the duct.

In another variant, a mobile plug, such as a proving pig, is arranged in the duct 16, in front of the heating element 18. By moving the plug, the pressure behind the plug decreases, so that the pressure reductions makes the heating element 18 move. It should be noticed that intermediate plugs could be arranged along the duct 16.

In another variant, the heating element 18 is pushed into the duct 16. For example, a pushing machine pushes the heating element 18. Such a pushing machine comprises at least one drive wheel, preferentially arranged at the first end of the pipeline 10.

It should be noticed that the invention could be implemented to any type of heated pipeline, for example off-shore or on-shore pipelines.

More particularly, the method of inserting a heating element 18 in a duct 16 of a heated pipeline 10 can be used on any type of heated pipeline. For example, this method can be used on a spool base, that is facility for constructing lengths of pipeline onshore (usually from 1 to 1.5 km of length), called stalks. Multiple stalks are reeled onto a pipelay vessel (and interconnected) and then put on the seabed. The method disclosed above can be used to install heating cables onto a reeled pipeline. The ducts 16 may need to be applied helicoidally to allow the heating element 18 to stay intact while reeling. The heating element installation into the pipeline can be done either onshore per stalk, or on the pipelay vessel during transit while the complete pipeline is sitting on the reel.

The invention claimed is:

1. A heated pipeline for conveying a fluid, comprising an inner pipe intended to convey the fluid, and an outer coating made of a thermal insulating material and covering the inner pipe, wherein the outer coating comprises at least one duct delimited, in a transverse plane, by a closed outline entirely defined in the thermal insulating material, each duct housing a respective heating element, and wherein the heated pipeline comprises at least one injection path communicating with the at least one duct, for injecting high pressurized water in the at least one duct.

2. The heated pipeline of claim 1, extending from a first end to a second end, wherein each duct is continuous between the first and second ends, each duct being able to hold a pressure higher than 3 bar.

3. The heated pipeline of claim 1, extending from a first end to a second end, wherein the inner pipe is made of a plurality of aligned assembled pipe sections, the outer coating is made of a plurality of aligned assembled coating sections, and each heating element is made of at least one respective continuous part longer than each pipe section.

4. The heated pipeline of claim 3, wherein each heating element is made of only one respective continuous part extending from the first end to the second end.

5. The heated pipeline of claim 1, wherein each duct is straight or helical.

6. The heated pipeline of claim 1, wherein, each duct being delimited by a wall, at least one of the heating element and the wall is coated with a low friction layer.

7. The heated pipeline of claim 1, wherein the outer coating comprises at least two ducts, and wherein the heating elements comprise cables chosen between:
   at least two single phase AC cables, each heating element being one of these single phase AC cables and being arranged in one respective of the ducts,
   at least two single phase DC cables, each heating element being one of these single phase DC cables and being arranged in one respective of the ducts.

8. A method of manufacturing a heated pipeline for conveying a fluid, comprising an inner pipe to convey the fluid, and an outer coating made of a thermal insulating material and covering the inner pipe, wherein the outer coating comprises at least one duct delimited, in a transverse plane, by a closed outline entirely defined in the thermal insulating material, each duct housing a respective heating element, wherein the method comprises the following steps:
   assembling pipeline segments, each having a respective pipe section and a respective coating section, to make the inner pipe with the outer coating,
   inserting each respective heating element in each duct by applying a pressure differential over the length of the duct potentially aided by a push force on the heating element.

9. The method of claim 8, wherein each heating element is inserted in the respective duct by pulling it along by pressurized fluid injected in the duct.

10. The heated pipeline of claim 1, wherein the outer coating comprises at least three ducts, and wherein the heating elements comprise at least one three-phase cable, arranged as three mono-phase cables, each mono-phase cable forming one of the heating elements and being arranged in one respective of the three ducts.

* * * * *